United States Patent
Dang et al.

(10) Patent No.: US 8,875,280 B2
(45) Date of Patent: Oct. 28, 2014

(54) PROTECTING AN ELECTRONIC DEVICE AGAINST UNATHORIZED HARDWARE USE

(75) Inventors: Tu T. Dang, Cary, NC (US); Michael C. Elles, Apex, NC (US); Mark G. Noll, Raleigh, NC (US); Ketan B. Patel, Raleigh, NC (US); Danny L. Woodruff, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/273,638

(22) Filed: Oct. 14, 2011

(65) Prior Publication Data
US 2013/0097694 A1    Apr. 18, 2013

(51) Int. Cl.
*G06F 21/00*    (2013.01)
(52) U.S. Cl.
CPC ...................................... *G06F 21/00* (2013.01)
USPC .......................................................... 726/17
(58) Field of Classification Search
USPC .......................................................... 726/17
See application file for complete search history.

(56) References Cited

U.S. PATENT DOCUMENTS

| | | |
|---|---|---|
| 5,283,422 A | 2/1994 | Storch et al. |
| 5,592,561 A | 1/1997 | Moore |
| 5,895,073 A | 4/1999 | Moore |
| 7,415,732 B2 | 8/2008 | Montecalvo et al. |
| 7,757,952 B2 | 7/2010 | Tuschel et al. |
| 7,815,117 B2 | 10/2010 | Tuschel et al. |
| 7,823,214 B2 * | 10/2010 | Rubinstein et al. ............. 726/34 |
| 7,845,016 B2 | 11/2010 | Diab et al. |
| 8,230,149 B1 * | 7/2012 | Long et al. .................... 710/305 |
| 8,341,729 B2 * | 12/2012 | Mandava ........................ 726/17 |
| 2010/0017330 A1 | 1/2010 | Tan |

* cited by examiner

*Primary Examiner* — William Powers
(74) *Attorney, Agent, or Firm* — William E. Schiesser; Keochane & D'Alessandro, PLLC (57) ABSTRACT

Embodiments of the present invention provide an approach for protecting electronic devices against the use of unqualified and/or unauthorized (e.g., "grey market") hardware components. Specifically, in a typical embodiment, a hardware component that a user is attempting to use with an electronic device will be detected. Then, the device information associated with the hardware component (e.g., serial number, vital product data (VPD), etc.) will be identified from the hardware component (e.g., as stored therein).

27 Claims, 6 Drawing Sheets

| PART NUMBER | SERIAL NUMBER |
|---|---|
| 44W2794 | 83V126 |
| 44W2727 | 8t5t6t |
| EBE41AE4ABHA-6E-E | 2236214C |
| EBE41AE4ABHA-6E-E | 2236214C |
| EBE41AE4ABHA-6E-E | 2236214C |
| EBE41AE4ABHA-6E-E | 2236214C |
| EBE41AE4ABHA-6E-E | 2236214C |
| EBE41AE4ABHA-6E-E | 2236214C |
| EBE41AE4ABHA-6E-E | 2236214C |
| EBE41AE4ABHA-6E-E | 2236214C |
| 44W2790 | AD2121 |

70 — EXAMPLE OF UNAUTHORIZED MEMORY
72 — DIMMS WITH SAME SERIAL NUMBER

PROTECTING AN ELECTRONIC DEVICE AGAINST UNATHORIZED HARDWARE USE

TECHNICAL FIELD

In general, the present invention relates to hardware verification and/or authorization. Specifically, embodiments of the present invention relate to the protection of electronic devices against unauthorized hardware use.

BACKGROUND

As computer-based systems continue to become more advanced, an increasing number of device manufactures are producing devices that can be used in conjunction with such systems (e.g., in a plug and play manner). However, this may lead to an introduction of unqualified and/or unauthorized (e.g., "grey market") hardware components into computing systems. The introduction of such hardware components may negatively affect the reliability of the computing systems, warranty costs, and/or user productivity.

SUMMARY

In general, embodiments of the present invention provide an approach for protecting electronic devices against the use of unqualified and/or unauthorized (e.g., "grey market") hardware components. Specifically, in a typical embodiment, a hardware component that a user is attempting to use with an electronic device will be detected. Then, the device information associated with the hardware component (e.g., serial number, vital product data (VPD), etc.) will be identified from the hardware component (e.g., as stored therein). The device information will then be compared to a data structure (e.g., stored in at least one computer storage device) that identifies authorization indicia (e.g., a set of known hardware components and associated component information). Based on this comparison, it will be determined whether the hardware component is authorized to be used in conjunction with the electronic device. If not, the use of the hardware component in conjunction with the electronic device will be prevented, and an alert will be generated.

A first aspect of the present invention provides a computer-implemented method for protecting electronic devices against use of unauthorized hardware, comprising: detecting a hardware component that a user is attempting to use with an electronic device; identifying device information associated with the hardware component from the hardware component; comparing the device information against a data structure that identifies authorization indicia, the data structure being stored in at least one computer storage device; and determining whether the hardware component is authorized to be used in conjunction with the electronic device based on the comparing.

A second aspect of the present invention provides a system for protecting electronic devices against use of unauthorized hardware, comprising: a memory medium comprising instructions; a bus coupled to the memory medium; and a processor coupled to the bus that when executing the instructions causes the system to: detect a hardware component that a user is attempting to use with an electronic device; identify device information associated with the hardware component from the hardware component; compare the device information against a data structure that identifies authorization indicia, the data structure being stored in at least one computer storage device; and determine whether the hardware component is authorized to be used in conjunction with the electronic device based on the comparing.

A third aspect of the present invention provides a computer program product for protecting electronic devices against use of unauthorized hardware, the computer program product comprising a computer readable storage media, and program instructions stored on the computer readable storage media, to: detect a hardware component that a user is attempting to use with an electronic device; identify device information associated with the hardware component from the hardware component; compare the device information against a data structure that identifies authorization indicia, the data structure being stored in at least one computer storage device; and determine whether the hardware component is authorized to be used in conjunction with the electronic device based on the comparing.

A fourth aspect of the present invention provides a method for deploying a system for protecting electronic devices against use of unauthorized hardware, comprising: providing a computer infrastructure being operable to: detect a hardware component that a user is attempting to use with an electronic device; identify device information associated with the hardware component from the hardware component; compare the device information against a data structure that identifies authorization indicia, the data structure being stored in at least one computer storage device; and determine whether the hardware component is authorized to be used in conjunction with the electronic device based on the comparing.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention provide an approach for protecting electronic devices against the use of unqualified and/or unauthorized (e.g., "grey market") hardware components. Specifically, in a typical embodiment, a hardware component that a user is attempting to use with an electronic device will be detected. Then, the device information associated with the hardware component (e.g., serial number, vital product data (VPD), etc.) will be identified from the hardware component (e.g., as stored therein). The device information will then be compared to a data structure (e.g., stored in at least one computer storage device) that identifies authorization indicia (e.g., a set of known hardware components and associated component information). Based on this comparison, it will be determined whether the hardware component is authorized to be used in conjunction with the electronic device. If not, the use of the hardware component in conjunction with the electronic device will be prevented, and an alert will be generated.

Figure 1:
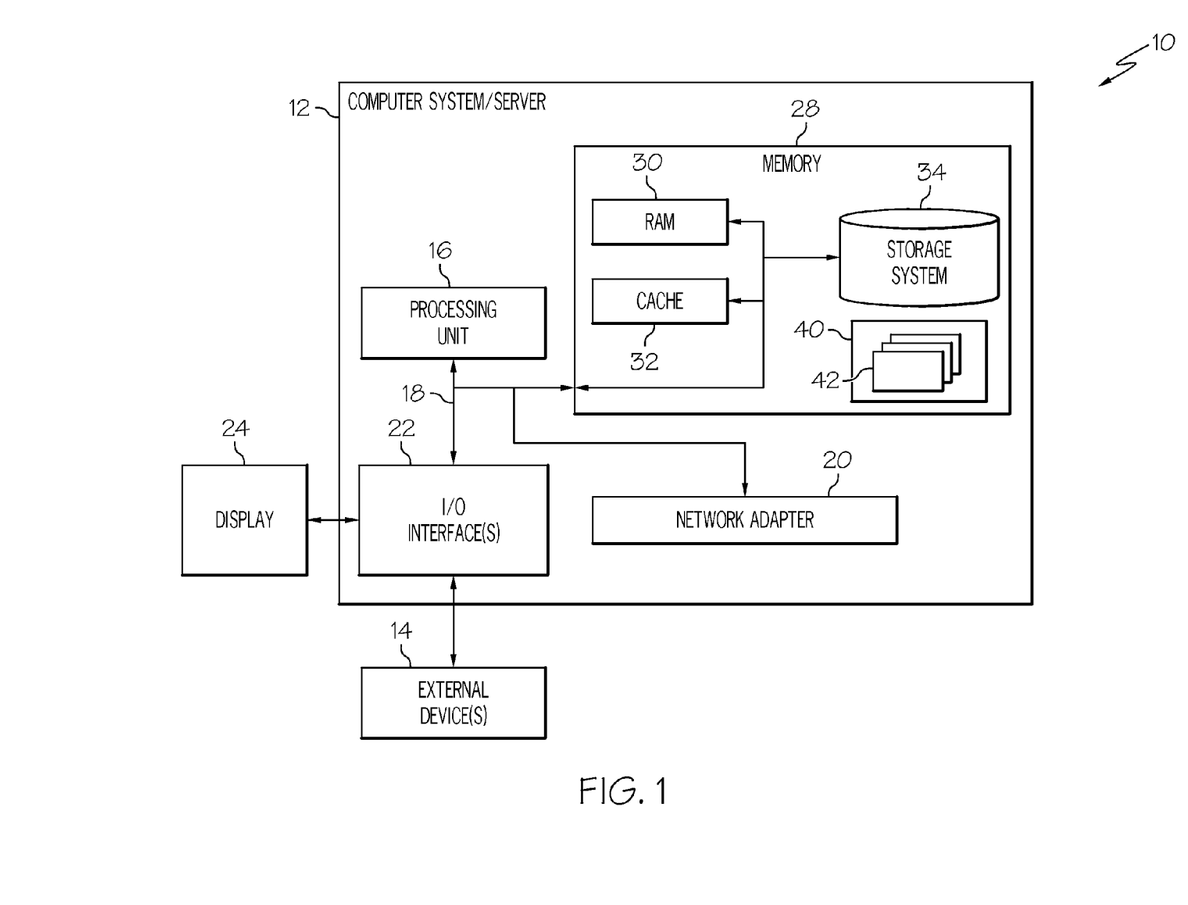
FIG. 1 depicts a computing node according to an embodiment of the present invention.

Referring now to FIG. 1, a schematic of an example of a computing node is shown. Computing node 10 is only one example of a suitable structure computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable structure for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable structure instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable structure combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable structure combination of the foregoing.

Device protection program/utility 40, having a set (at least one) of program modules 42, may be stored in memory 28 by way of example, and not limitation, as well as an operating system, one or more application programs, other program modules, and program data. In general, device protection program 40 performs the function of the present invention as described herein.

Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
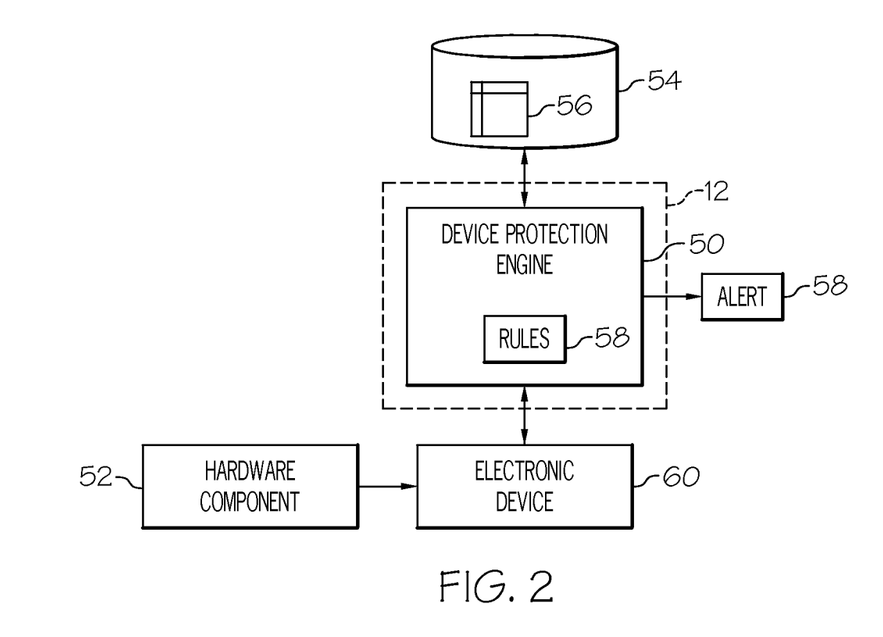
FIG. 2 depicts a system diagram according to an embodiment of the present invention.

Referring now to FIG. 2, a system diagram according to an embodiment of the present invention is shown. It is understood that the teachings recited herein may be practiced within a networked computing environment (e.g., a cloud computing environment). A stand-alone computer system/server 12 is shown in FIGS. 1 and 2 for illustrative purposes only. In the event the teachings recited herein are practiced in a networked computing environment, each client need not have engine 50. Rather, engine 50 could be loaded on a server or server-capable device that communicates (e.g., wirelessly) with the clients to provide device protection therefor. Regardless, as depicted, a device protection engine (engine 50) is shown within computer system/server 12. In general, engine 50 can be implemented as program 40 on computer system 12 of FIG. 1 and can implement the functions recited herein. As further shown, engine 50 (in one embodiment) comprises a rules and/or computational engine that processes a set (at least one) of rules 58 and/or provides device protection thereunder.

Along these lines, engine 50 may perform multiple functions similar to a general-purpose computer using rules 58. Specifically, among other functions, engine 50 may (among other things): detect a hardware component 52 (e.g., a computer storage device such as a flash memory device, or a "jump drive") that a user is attempting to use with an electronic device 60; identify device information (e.g., a serial number, vital product data (VPD), device key, component key, etc.) associated with the hardware component 52 from the hardware component 52; compare the device information against a data structure/table 56 (e.g., stored in at least one computer storage device/medium 54) that identifies a set of known hardware components and/or associated component information; determine whether the hardware component 52 is authorized to be used in conjunction with the electronic device 60 based on the comparing; prevent use of the hardware component 52 in conjunction with the electronic device 60 responsive to the comparing indicating that the hardware component 52 is unauthorized; authorize and/or unlock use of electronic component in conjunction with the electronic device 60 responsive to the comparing indicating the hardware component 52 is authorized; and/or generate an alert (e.g., email, etc.) responsive to the preventing. It is understood that the electronic device could comprise a computer system, a handheld device, etc. In addition, engine 50 could also be configured to prevent the unauthorized use of hardware components in conjunction with computer system/server 12. That is, computer system/server 12 could be the "electronic device" for which use of unauthorized hardware components is prevented. A separate electronic device 60 has been shown for illustrative purposes only and to demonstrate the flexibility of the embodiments discussed herein.

Regardless, embodiments of the present invention provide an approach for gathering, storing, and/or "scrubbing" the available unique information such as contained within Vital Product Data (VPD) or Serial Presence Detect (SPD) areas of various commodities/hardware components, to identify unauthorized parts. Unauthorized parts often possess such characteristics as duplicated serial numbers, out-of-range serial numbers, unknown or unqualified suppliers, date codes or batch codes that are out of range, etc. Computer commodities such as memory, storage devices, etc., typically have an area where the manufacturer has written unique information about the commodity. During system power-up, many systems read and store the unique information into persistent storage areas on the system. Also, the information may be off-loaded to a centralized database within a manufacturing or a data center site, as part of asset management. In such a case, engine 50 can be deployed in the data center environment during an introduction of a product, following a repair, replacement, upgrade, or adding new hardware action. Engine 50, which collects commodity information, "scrubs" the data and compares the data to known authorized (or known unauthorized) values contained in data structure 56. As indicated above, data structure 56 (e.g., table, list, linked list, etc.) typically associates the hardware components/commodities with corresponding information. This helps to ensure that: installed hardware components are authentic (e.g., not "gray market"); installed commodity serial numbers are not duplicates; manufacturer part numbers are genuine; part numbers and/or serial numbers match the commodity's description; date codes are valid; and/or the supplier of the commodity is a "qualified" or authorized supplier. Questionable results (e.g., unauthorized components/commodities) may trigger generation of an alert to the system's administrator with a suggested corrective action.

ILLUSTRATIVE EXAMPLE

Figure 3:
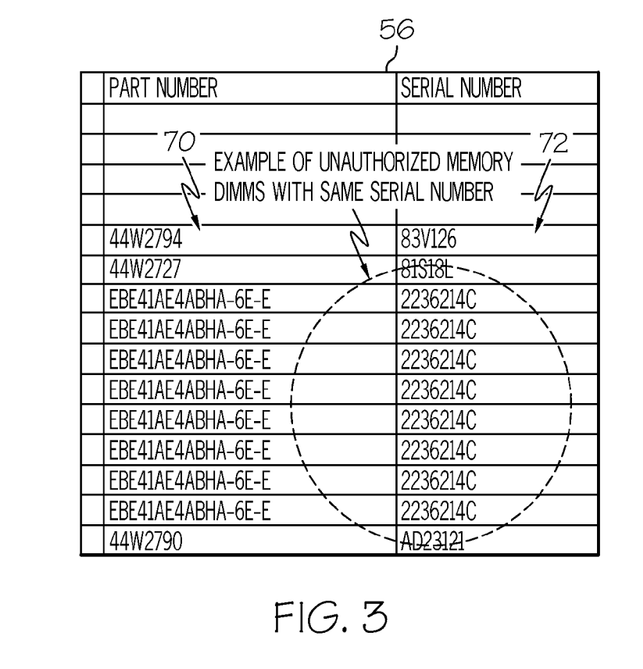
FIG. 3 depicts an illustration of hardware components and component information according to an embodiment of the present invention.

Assume a plurality of unauthorized memory dual in-line memory modules (DIMMs) 70 with identical serial numbers 72 as shown in data structure 56 of FIG. 3. In general, FIG. 3 illustrates an example to authenticate devices in systems using the unique VPD/SPD data in a data center or server farm. In this example, data structure 56 comprises a list of unauthorized devices (although this need not be the case, as the list could have contained authorized devices in addition to, or in lieu of, the unauthorized devices). Under this example, when a user attempts to use a hardware component in conjunction with an electronic device, the engine (50 of FIG. 2) will identify/locate the component's device information (e.g., as electronically stored therein, on a barcode associated therewith, etc.), and compare it to data structure 56. If it matches any of the device information contained in data structure 56, an alert will be generated and/or use of the hardware component will be prevented/denied in conjunction with the electronic device. Alternatively, if the hardware component is authorized, it will be enabled for sue with electronic device.

In addition to the examples discussed above, embodiments of the present invention further comprise an approach for identifying hardware suspected of being unauthorized by tracking the electronic device's serial number or suspected hardware component's serial number. This information may be linked to a business intelligent data mining tool that provides the identity of the client and/or system integrator, along with information associated with the company's/user's business/usage pattern, weighting and ranking. For a plurality of suspected hardware components, a pattern recognition algorithm may be used within engine 50 (FIG. 2) to compute a "P" value using a statistical significant testing. A decision based on a pre-defined confidence interval can then be made to call out the faulty commodity.

Figure 4:
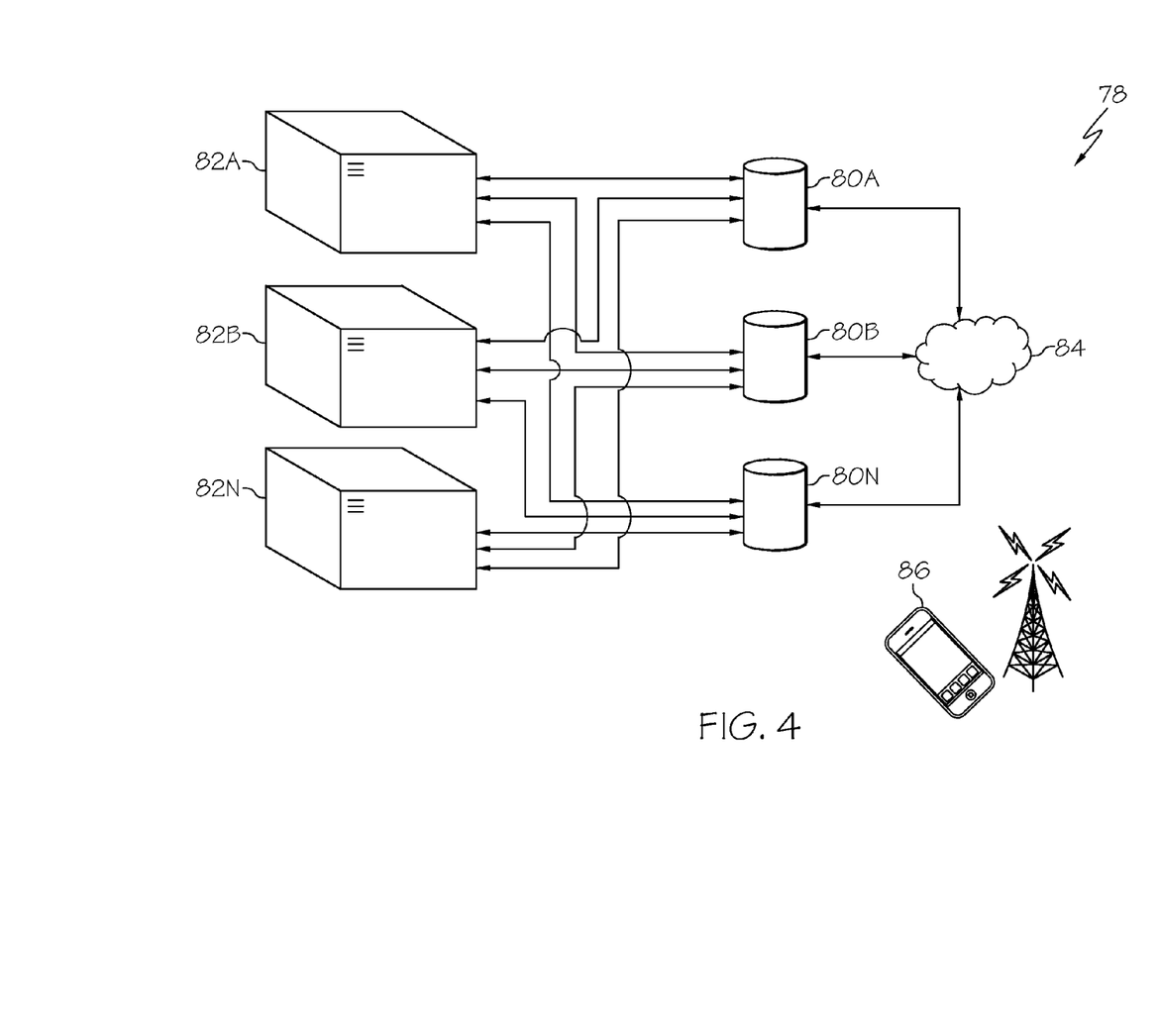
FIG. 4 shows a diagram of a networked computing environment-based approach according to an embodiment of the present invention.

As depicted in FIG. 4, the accuracy of this approach can be further improved by increasing sample size, such as a networked computing environment 78 (e.g., a cloud computing environment). Specifically, as shown in FIG. 4, a set of systems 82A-N communicates with a set of databases 80A-N that are Internet-enabled to form a cloud computing environment 84. Business partners, system integrators, end users, etc. (if authorized), can access the cloud environment 84 via systems 82A-N and/or a mobile device 86. Barcode reader hardware integrated within mobile device 86 can be used to collect the barcode information from barcode labels, which provide additional unique manufacturing data to supplement the collected information in the databases. This information can be used by the engine to make a determination as to whether other hardware components can be used in conjunction with systems 82A-N and/or mobile device 86 itself as described above.

Figure 5A:
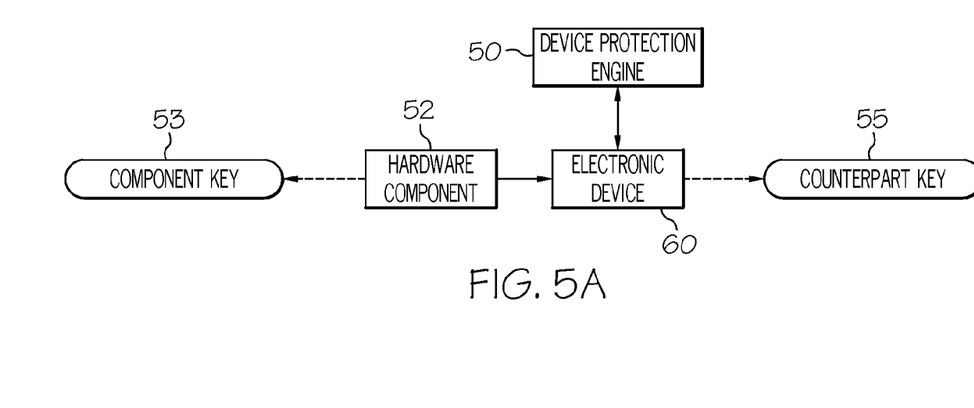
FIGS. 5A-B show diagrams of key-based implementations according to additional embodiments of the present invention.

In an alternate embodiment shown in FIG. 5A, hardware component 52 may contain a component key 52, or the like, that specifically pertains to hardware component 52. In such an embodiment, electronic device 60 may include or have access to one or more counterpart keys 55 (e.g., that correspond to "approved/authorized" hardware components). When a user (e.g. a system administrator or technician) attempts to add (e.g. electronically connect) hardware component 52 to electronic device 60, the component key 52 can be compared (by engine 50) to the plurality of counterpart keys 55 stored on a memory device (e.g. a Read Only Memory (ROM) device) on (and/or accessible to) electronic device 60. If a match is found, the hardware component 52 may be "unlocked" and enabled for use with electronic device 60 (by engine 50). Conversely, if a match is not found, hardware component 52 could be "locked out" by electronic device 60 and precluded/disabled from use with electronic device 60 (by engine 50).

Figure 5B:
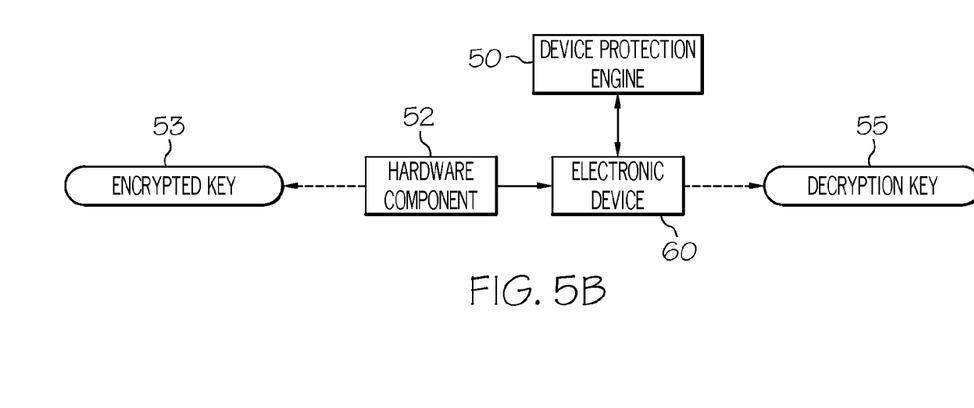

In yet another alternate embodiment shown in FIG. 5B, hardware component 52 may contain an encrypted component key 57, or the like, that specifically pertains to hardware component 52. In such an embodiment, electronic device 60 may include or have access to one or more decryption keys and/or decryption algorithms 59 (e.g. a Public Key Infrastructure (PKI) key and/or a private key utilizing symmetric or asymmetric cryptographic algorithms or ciphers) that may be utilized to decrypt the encrypted component key 57. When a user (e.g. a system administrator or technician) attempts to add (e.g. electronically connect) hardware component 52 to electronic device 60, the one or more decryption keys and/or decryption algorithms 59 may be utilized (e.g., by engine 50) to decrypt the encrypted component key 57 contained on hardware component 52. If the encrypted component key 57 resolves to a particular value when decrypted (as determined by engine 50), the hardware component 52 may be "unlocked" and enabled for use with electronic device 60. In one example, the particular value could be an alphanumeric string known only to the manufacturer of electronic device 60 and an authorized manufacturer of plug-compatible components such as component 52, e.g. the particular value could be a valid manufacturer's serial number for hardware component 52. Conversely, If the encrypted component key 57 does not resolve to a particular value, hardware component 52 could be "locked out" by electronic device 60 and precluded/disabled from use with electronic device 60 (by engine 50).

Figure 6:
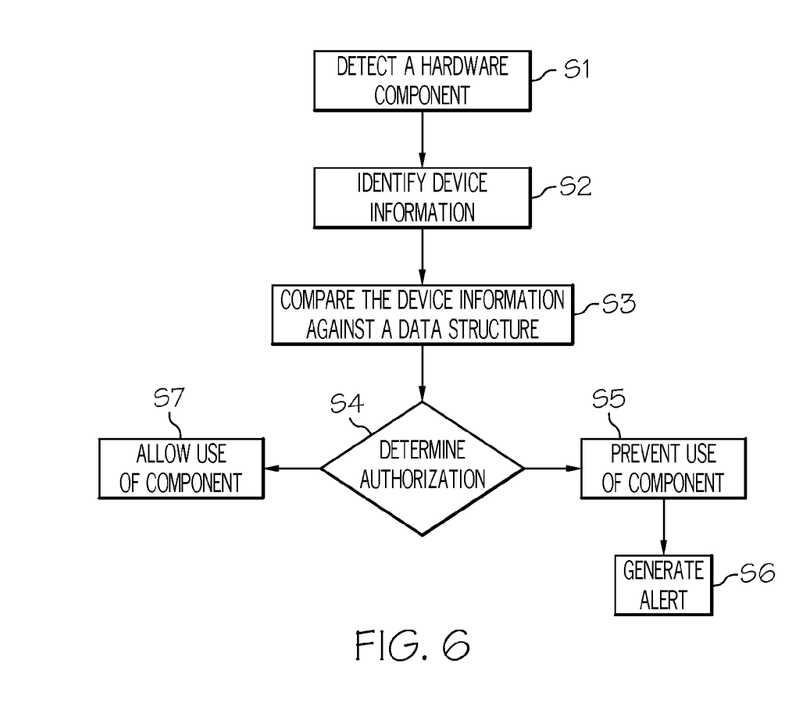
FIG. 6 depicts a method flow diagram according to an embodiment of the present invention.

Referring now to FIG. 6, a method flow diagram according to the present invention is shown. In step S1, a hardware component that a user is attempting to use with an electronic device is detected. In step S2, device information associated with the hardware component is identified (e.g., extracted from within) in the hardware component. In step S3, the device information is compared to a data structure that includes authorization indicia pertaining to a set of known hardware components and/or associated component information. In step S4, it is determined whether the hardware component is authorized to be used in conjunction with the electronic device (e.g., based on the comparing). If not, usage is prevented in step S5, and an alert is generated in step S6. If the hardware component was authorized, use of the hardware component can be allowed step S7.

While shown and described herein as a device protection system, it is understood that the invention further provides various alternative embodiments. For example, in one embodiment, the invention provides a computer-readable/useable medium that includes computer program code to enable a computer infrastructure to provide device protection functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable structure storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide device protection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for a device protection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12

(FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable structure for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for protecting electronic devices against use of unauthorized hardware, comprising:
   detecting a hardware component that a user is attempting to use with an electronic device;
   identifying device information associated with the hardware component from the hardware component;
   comparing the device information against a plurality of device information entries stored in a data structure that identifies authorized and unauthorized hardware component indicia, the data structure being stored in at least one computer storage device that is external to the electronic device and the hardware component;
   identifying whether the hardware component is a suspected hardware component based on the comparing; and
   determining whether the suspected hardware component is authorized to be used in conjunction with the electronic device based on a confidence interval.

2. The computer-implemented method of claim 1, the authorization indicia comprising identifying hardware components and associated component information.

3. The computer-implemented method of claim 1, the component information comprising at least one of the following: a serial number, vital product data (VPD), or a component key.

4. The computer-implemented method of claim 1, the unauthorized hardware component indicia comprising one or more of: duplicated serial numbers, out-of-range serial numbers, an unknown or unqualified supplier, and an out-of-range date code or batch code.

5. The computer-implemented method of claim 1, further comprising preventing use of the hardware component in conjunction with the electronic device responsive to the comparing indicating that the hardware component is unauthorized.

6. The computer-implemented method of claim 5, further comprising generating an alert responsive to the preventing.

7. The computer-implemented method of claim 1, the hardware component comprising a computer storage device.

8. The computer-implemented method of claim 1, further comprising authorizing use of the hardware component in conjunction with the electronic device responsive to the comparing indicating that the hardware component is authorized.

9. The computer-implemented method of claim 1, the component information comprising a component key and the authorizing indicia comprising a counterpart key, wherein the comparing comprises a determining whether the component key matches the counterpart key.

10. The computer-implemented method of claim 1, the component information comprising an encrypted key and the authorizing indicia comprising a decryption key, wherein the comparing comprises decrypting the encrypted key with the decryption key and comparing a result of the decrypting with a particular value.

11. A system for protecting electronic devices against use of unauthorized hardware, comprising:
    a memory medium comprising instructions;
    a bus coupled to the memory medium; and
    a processor coupled to the bus that when executing the instructions causes the system to:
       detect a hardware component that a user is attempting to use with an electronic device;
       identify device information associated with the hardware component from the hardware component;
       compare the device information against a plurality of device information entries stored in a data structure that identifies authorized and unauthorized hardware component indicia, the data structure being stored in at least one computer storage device that is external to the electronic device and the hardware component;
       identify whether the hardware component is as a suspected hardware component based on the comparing; and
       determine whether the suspected hardware component is authorized to be used in conjunction with the electronic device based on a confidence interval.

12. The system of claim 11, the memory medium further comprising instructions for causing the system to identify hardware components and associated component information.

13. The system of claim 11, the component information comprising at least one of the following: a serial number, vital product data (VPD), or a component key.

14. The system of claim 11, the unauthorized hardware component indicia comprising one or more of: duplicated serial numbers, out-of-range serial numbers, an unknown or unqualified supplier, and an out-of-range date code or batch code.

15. The system of claim 11, the memory medium further comprising instructions for causing the system to prevent use of the hardware component in conjunction with the electronic device responsive to the comparing indicating that the hardware component is unauthorized.

16. The system of claim 15, the memory medium further comprising instructions for causing the system to generate an alert responsive to the preventing.

17. The system of claim 11, the hardware component comprising a computer storage device.

18. The system of claim 11, the memory medium further comprising instructions for causing the system to authorizing use of the hardware component in conjunction with the electronic device responsive to the comparing indicating that the hardware component is authorized.

19. A computer program product for protecting electronic devices against use of unauthorized hardware, the computer program product comprising a computer readable storage device, and program instructions stored on the computer readable storage device, to:
   detect a hardware component that a user is attempting to use with an electronic device;
   identify device information associated with the hardware component from the hardware component;
   compare comparing the device information against a plurality of device information entries stored in a data structure that identifies authorized and unauthorized hardware component indicia, the data structure being stored in at least one computer storage device that is external to the electronic device and the hardware component;
   identify whether the hardware component is as a suspected hardware component based on the comparing; and
   determine whether the suspected hardware component is authorized to be used in conjunction with the electronic device based on a confidence interval.

20. The computer program product of claim 19, the computer readable storage device further comprising instructions to identify hardware components and associated component information.

21. The computer program product of claim 19, the component information comprising at least one of the following: a serial number, vital product data (VPD), or a component key.

22. The computer program product of claim 19, the unauthorized hardware component indicia comprising one or more of: duplicated serial numbers, out-of-range serial numbers, an unknown or unqualified supplier, and an out-of-range date code or batch code.

23. The computer program product of claim 19, the computer readable storage device further comprising instructions to prevent use of the hardware component in conjunction with the electronic device responsive to the comparing indicating that the hardware component is unauthorized.

24. The computer program product of claim 23, the computer readable storage device further comprising instructions to generate an alert responsive to the preventing.

25. The computer program product of claim 19, the hardware component comprising a computer storage device.

26. The computer program product of claim 19, the computer readable storage device further comprising instructions to authorizing use of the hardware component in conjunction with the electronic device responsive to the comparing indicating that the hardware component is authorized.

27. A method for deploying a system for protecting electronic devices against use of unauthorized hardware, comprising:
   providing a computer infrastructure being operable to:
      detect a hardware component that a user is attempting to use with an electronic device;
      identify device information associated with the hardware component from the hardware component;
      compare the device information against a plurality of device information entries stored in a data structure that identifies authorized and unauthorized hardware component indicia, the data structure being stored in at least one computer storage device that is external to the electronic device and the hardware component;
      identify whether the hardware component is as a suspected hardware component based on the comparing; and
      determine whether the suspected hardware component is authorized to be used in conjunction with the electronic device based on a confidence interval;
   wherein the unauthorized hardware component comprises one or more of: duplicated serial numbers, out-of-range serial numbers, an unknown or unqualified supplier, and an out-of-range date code or batch code.

* * * * *